Oct. 15, 1968  C. R. TATE  3,406,363

MULTICOLORED MICROMAGNETS

Filed May 26, 1966

INVENTOR.
CLARENCE R. TATE
BY
Carpenter, Kinney & Boulter
ATTORNEYS

United States Patent Office 3,406,363
Patented Oct. 15, 1968

3,406,363
MULTICOLORED MICROMAGNETS
Clarence R. Tate, 307 E. Court St.,
Fairfield, Ill. 62837
Filed May 26, 1966, Ser. No. 553,087
6 Claims. (Cl. 335—302)

This invention relates to improved micromagnets for magnetically actuatable visual display devices and methods for forming such micromagnets.

In U.S. Patent 3,036,388, since reissued as Re. 25,363 and Re. 25,822, I have described magnetic writing materials employing magnetically orientable color coded particles. The particles in a liquid suspending medium beneath a transparent face plate, for example, may be oriented with their first-color poles toward the viewing surface by passing over the surface a flat erasing magnet. The particles are made to possess a low volumetric magnetization so that their magnetic strength is not sufficient to cause a magnetic interaction when in close association with each other, which would prevent selective orientation by an activating external magnetic force, and a magnetic field of opposite polarity applied to a portion of the surface reorients the affected particles with their second-color poles exposed to view thereby forming a visibly distinct pattern.

The present invention provides new magnetic particles having two or more colors for use in magnetically actuated visual display devices. The invention further provides an improved method for the manufacture of such particles, which method permits high production rates. In a further embodiment of the invention, tiny magnetic particles are provided which have more than two colors, and multi-color visual displays are provided using such particles.

Further objects and advantages will be apparent from the accompanying detailed description and drawings wherein.

The magnetic orientation of the several particles is illustrated by the arrow in each of the figures, the arrowhead in each instance, for convenience, indicating the north pole. Although other magnetic materials are also useful, I prefer to use small proportions of magnetic materials of high retentivity such as barium ferrite, together with a diluent or extender which may also serve as a binder for the powdered magnetic material.

The tiny particles are conveniently described as having a constant magnetization vector, the term including both direction and magnitude. The direction of magnetization, i.e., the permanent magnetic axis, may have any desired relationship to the surface color zones, as will be further described. The magnetic particles shall be referred to hereinafter as "micromagnets."

Micromagnets small enough to pass through a 325-mesh Tyler standard screen, i.e. about 45 microns, provide a smooth uniform appearance at the viewing surface since the individual micromagnets cannot be resolved by the eye. Micromagnets not larger than about 100 microns are preferred but micromagnets up to about 2000 microns are generally useful.

It is preferred to suspend the micromagnets in a suspending fluid in which the micromagnets will rotate therein upon the application of a magnetic field. It is desirable to provide this fluid with a viscosity and thixotropy such that a certain minimum force must be applied in order to rotate the micromagnets. Such viscosity and thixotropy provide a degree of stability to the display device, minimizing unwanted disorientation of the micromagnets. Finely divided magnesium aluminum silicate (Bentone) may be dispersed in a light oil, for example, to provide the desired viscosity and thixotropy.

Figure 1:
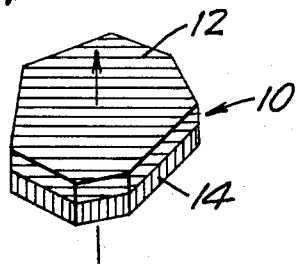
FIGURE 1 is a magnified perspective view of a two-colored magnetically orientable particle.

Micromagnets can be manufactured rapidly and economically by forming appropriately colored compositions containing magnetizable material into thin flat sheets made up of two or more distinctly colored layers. For example, different colored hardenable solutions or suspensions can be cast successively onto a smooth carrier web or other suitable casting surface to form a layered sheet. The sheet is subjected to a strong magnetic field to magnetize the magnetizable material, hardened, and broken up into a finely divided state by impacting in an agitator or in other suitable fragmentizer such as a mechanical blender. The order of these steps may be interchanged if desired. Hardening can be accomplished by curing and/or drying the compositions until relatively brittle. Although it might be expected that violently reducing the sheet to a virtual powder would result in particles either singly colored or unusable because of randomly different characteristics, it has been found that progressive fragmentation tends to break the sheet across the broad dimensions, which provide the lines of least resistance to fracture. Each micromagnet therefore tends to retain its individual magnetic and color zone integrity so long as fragmentation is stopped before the micromagnets are reduced in size and dimension to less than the thickness of the sheet. The micromagnet shown in FIGURE 1 is typical of those produced by this method. As shown, the individual micromagnets have flat, generally parallel top and bottom surfaces and irregularly shaped edges. The particles illustrated are magnetized so that the magnetic axis of each micromagnet is substantially normal to the flat parallel surfaces. Micromagnet 10 shown in FIGURE 1 has a first color 12 adjacent the north pole and a different color 14 adjacent the south pole.

Figure 2:
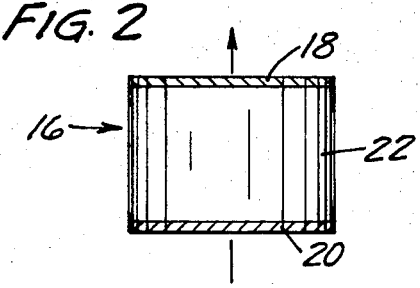
FIGURES 2 and 3 are magnified views in elevation of magnetically orientable differently shaped particles having three different color zones.

In FIGURE 2 is shown an edge view of a three-colored micromagnet 16 which may be made by a similar procedure to that just described. Micromagnet 16 is provided with a first color 18, for example blue, on the surface adjacent to the north pole and second color 20, for example white, on the surface adjacent the south pole. Sandwiched between layers 18 and 20 is a third colored layer 22, for example red. When used in a display device micromagnet 16 will present its blue colored surface when the south pole of a magnet is passed over the display device and its white colored surface when a north pole of a magnet is passed in front of the display device. A magnet having closely adjacent north and south poles, passed over the surface, will orient the micromagnets between its poles to an edgewise position to display a mark of a third color, red. The colors may be selected to produce other colors in combination. For example, a yellow layer and a blue layer produces green when oriented to blend, and shades and blends may be also produced by orienting the micromagnets to intermediate degrees, the activating magnetic force in this case being of a strength and duration insufficient to cause a full 90° or 180° orientation.

Figure 3:
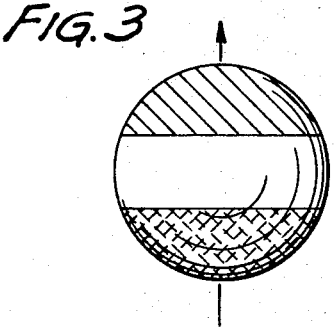

The micromagnet of FIGURE 3 is spherical, three colored, and can be similarly actuated. Three or more colored micromagnets can also be made in other shapes such as cubical, cylindrical, etc., if desired. Various methods for forming such micromagnets such as extrusion and cutting, etc., will be apparent to those skilled in the art.

The micromagnets of this invention may be carried in a liquid suspension medium or used in dry powder form and the external activating magnetic force may be that from a permanent magnet or from an electrical field. The micromagnets may be spread dry on a sheet of paper, for example, and an external activating magnetic force passed under the carrier to produce a visual display.

By subjecting a sheet containing magnetizable material to a magnetic field first in one direction and then in another, it is possible to produce particles having more than one magnetic axis. Such axes may be of equal or, more preferably, of differing strengths, thus making it possible to control the orientation of the particles in more than one direction. The same effect can be produced by forming two or more sheets of contrasting color, magnetizing the sheets in different directions, then laminating the sheets and fracturing the sheets to produce particles having multiple magnetic axes.

In some cases it is desirable to magnetize the particles in a direction other than parallel to the color axes, for example, in a direction normal thereto. For example, particles having three color zones could be formed in which the two outer zones are white and the middle zone is black having magnetic axes parallel to the layers. Such particles when lying at random would present a predominantly white viewing surface on which a black line could be produced by applying to the surface thereof either a north or south pole magnet.

The magnetic strength of the particles can be varied by changing the proportion or the type of magnetizable material added, or by varying the strength of the magnetizing field. In the case of particles suspended within a liquid medium, the tendency to cluster can be reduced by using a more viscous liquid.

The following examples, in which proportions are given by weight unless otherwise indicated, will serve to illustrate but not limit the invention. Also the colors mentioned and the layer thickness given are illustrative and may be varied to produce displays having any desired combinations of colors and sharpness of images.

EXAMPLE I

Color coded micromagnets were prepared with a binder of lacquer containing appropriate color pigments. The lacquer was a widely marketed type containing cellulose nitrate, ester gum, plasticizer, glycol esters, alcohols, aromatic and aliphatic hydrocarbons and was slightly thinned with lacquer thinner. A white portion contained 60 parts of lacquer, and 50 parts of titanium dioxide pigment. A red portion contained 75 parts of the lacquer and 25 parts of red pigment. A black portion contained 60 parts of lacquer, 20 parts of carbon black, and 10 parts of powdered barium ferrite. Corn starch, added to the blends, will provide additional thickening, if desired.

The several blends were then coated in successive layers on a polyethylene carrier with intermediate drying. In spreading, the depth of each layer was controlled by drawing the sheet between spaced bars although other means such as the use of rollers are also suitable. Compositions of lighter viscosity can be sprayed or otherwise coated. The dried sheet was made up of a first layer ½ mil thick of white, a central layer of ¾ mil of red, and a third layer of ¼ mil of the black, the layers being parallel to each other.

Several sheets of the coated carrier were stacked, each with the same color up, between the poles of a large electromagnet where they were subjected to a strong field to saturate the magnetizable barium ferrite component. The sheets were then peeled from the carrier and broken up by vigorous agitation by impacting in an agitator or in a mechanical blender into micromagnets capable of passing through a 325 mesh Tyler screen.

Micromagnets with more than three color zones can be obtained from a sheet having additional other colored layers and two color micromagnets can be made in this manner from a sheet having laminations with only two contrasting colors.

EXAMPLE II

A curable epoxy resin composition is used as a binder, the composition consisting of 100 parts of liquid epoxy resin to which is added 35 parts of liquid curing agent just prior to coating and thoroughly mixed with this is 100 parts of titanium dioxide. The epoxy resin has a viscosity of 150–210 cps. at 77° F. and the curing agent has a viscosity of 150–400 cps. at 77° F. The mixture is then spread in an even layer to a thickness of about 1 mil on a temporary carrier, such as a sheet of glass, the surface of which has been previously prepared with a film of mold release agent, and is permitted to cure either by heat or the passage of time to a hardened state. A second layer, preferably thicker, from a composition of 100 parts of epoxy resin, 35 parts of curing agent, 15 parts of carbon black, and 15 parts of powdered barium ferrite, is then applied and similarly cured. Then another thin layer from a composition like that of the initial layer, except containing 40 parts of a red coloring pigment instead of white, is applied and permitted to cure. The cured material is directionally magnetized by placing the sheet between the pole pieces of an electromagnet where it is subjected to a magnetic field which magnetizes the barium ferrite component. The sheet is removed from the temporary carrier by peeling and is then fragmented to a virtual powder under vigorous agitation. Any oversize micromagnets are screened out.

EXAMPLE III

In another modification of the invention, color zones are produced on preformed magnetizable particles. Barium ferrite is first well mixed with plaster of Paris and the mixture is made into a sprayable slurry with water. It is then dispersed into small droplets by spraying from a spray gun, and the particles are allowed to fall through the air onto a soft collecting surface and there to harden by hydration or setting of the plaster. A quantity of tiny substantially spherical or spheroidal hard particles is obtained. The mass is screened to remove off-size particles.

The particles are pre-sized and colored over their entire surface with a yellow pigmented lacquer. This is done by dispersing the particles in the lacquer, considerably thinned, and spraying the mixture through a spray gun through the air onto a receiving surface, the lacquer coating on the particles' surfaces drying sufficiently while falling to avoid agglomeration.

A thin layer of diluted quick-drying paint having very finely ground pigment and of a contrasting color is spread on a flat paper surface and the spheroids dropped thereon with sparse distribution. The paint wets and colors the lower surface area of the particles after which the paper, with the particles adhering in the paint to the surface, is subjected to magnetic flux as in Example I. When most of the volatile solvent is evaporated from the paint, the particles are then snapped or brushed from the surface, the retained paint on their surfaces being now virtually dry.

The particles are, at this point, two-color micromagnets, which may be used to form a two-color display or the same coating procedure is repeated but with a different colored paint and using a strong magnetic field, such as that from a pole of a broad flat magnet placed under the receiving paper, to orient the falling micromagnets with their previously painted surfaces up. The depth of the paint layer is less than the radius of the spheroids so that the central portions expose the first yellow color. The double coated particles are then removed from the paper and magnetically orientable particles having three adjacent color zones bounded by parallel planes and magnetized in the direction of the color axis, i.e., perpendicular to the said planes, are thereby obtained.

Additional color zones may be provided by extensions of the procedures described and zones may be in any combination of colors or any relative widths desired. The same or different colors may be applied at opposite poles of the micromagnets. Micromagnets may be supplied with two, three, or more color zones depending somewhat on the particle size, the viscosity, surface tension and wetting characteristics of the paint, the thickness of the paint layers, etc.

EXAMPLE IV

A hardenable white composition was prepared by mixing the following ingredients:

| | Parts |
|---|---|
| Styrene butadiene copolymer containing 65% by weight TiO$_2$ pigment (Goodyear Pliolite 1A–S5) | 16.6 |
| Toluol solvent | 25 |

This composition was roll coated with a rotogravure 120 tri-helicoid roll at a rate of 15 yards per minute onto a plastic release web. This coating was oven dried at 250° F. The coating had a dry weight of .00073 gram/cm.$^2$ of area. A black colored hardenable coating composition was prepared by mixing the following ingredients:

| | Parts |
|---|---|
| Styrene butadiene copolymer containing 40% carbon black (Goodyear Pliolite 2C–S5) | 4.5 |
| Barium ferrite containing polymer (.224 part barium ferrite, 0.071 part clear styrene butadiene copolymer Pliolite S5–E, 0.295 part toluol) | 0.59 |
| Toluol | 14.5 |

This composition was coated using the 80 tri-helicoid rotogravure roll over the white layer and oven dried at 250° F. The black layer had a dry weight of 0.00065 gram/cm.$^2$. The combined layers had a weight of 0.00138 gram/cm.$^2$ and a calculated density of 1.77 grams per cc. The combined layers had a barium ferrite content of 2.2%. The hardened material was passed on the carrier web between the poles of an electromagnet, magnetized at 9000 gauss at a speed of 1 foot per second. Material was removed from the carrier web by flexing and air blasted and conveyed at high velocity through a tortuous path and impinged against itself and other obstructions until the average particle diameter was about 1½ times its thickness. Oversized particles were removed by screening. A suspension in oil of the black and white micromagnets thus obtained was formed by mixing the particles into the following oily mixture:

| | Parts |
|---|---|
| Low molecular weight chlorotrifluoroethylene polymer having a density of 1.9 and a Brookfield viscosity at 72° F., #1 spindle, 30 r.p.m., of 124 centipoise (Kel F Oil #3, 3M Co.) | 300.00 |
| Oil having a density of 0.85 and a Brookfield viscosity at 72° F. of 24 centipoise #1 spindle, 60 r.p.m. (Retrax, Std. Oil Co.) | 269.00 |
| Purified Bentonite with an organic base, gelling agent (Bentone 38, Nat. Lead Co.) | 1.00 |
| Stearic acid | 4.75 |

The oil mixture had an approximate density of 1.21 and approximate viscosity of 70 centipoise when measured on the Brookfield Viscosimeter using a #1 spindle at 30 r.p.m.

A resin mixture was formulated by mixing the following ingredients:

| | Parts |
|---|---|
| Copolymer of vinyl acetate and a carboxylated monomer (Gelva C5–V10, Shawinigan Corp.) | 86.0 |
| Saturated polyester resin, plasticizer (Harflex 340, Harchem Div., Wallace & Tiernan, Inc.) | 8.6 |
| Methanol | 180.0 |

The resin mixture had a calculated density of approximately 0.91 and a Brookfield viscosity of 140 centipoise. An oil resin emulsion was formed by mixing 1 part by volume of the magnet contained oil mixture with 3.5 parts by volume of the resin. After mixing, an emulsion was formed in which the resin was a continuous phase having dispersed therein oil droplets averaging about 10 mils in diameter as a discontinuous phase. One or more colored micromagnets were contained within the preponderant number of oil droplets. The emulsion was knife coated using a 0.025 setting on 2 mil hard aluminum foil precoated with a 2 mil thick black-pigmented vinyl acetate based coating. The coating was dried by passing high velocity room temperature air thereover until a surface skin was formed followed by air drying overnight.

What is claimed is:

1. Magnetically orientable micromagnets having at least three separate and distinct surface color zones and a constant magnetization vector, said magnetization vector being insufficient in strength to cause among the micromagnets in close association a sufficient magnetic interaction to prevent selective orientation by an external activating magnetic force.

2. Magnetically orientable micromagnets having at least three separate and distinct surface color zones and a constant magnetization vector, said magnetization being insufficient in strength to cause among the micromagnets in close association in a liquid a sufficient magnetic interaction to prevent selective orientation by an external activating magnetic force.

3. Magnetically orientable micromagnets having at least two separate and distinct surface color zones and a constant magnetization vector, said magnetization being insufficient in strength to cause among the micromagnets in close association a sufficient magnetic interaction to prevent selective orientation by an external activating magnetic force, said micromagnets having flat, generally parallel, top and bottom surfaces and irregularly shaped edges, the thickness of said particles between said top and bottom surfaces being less than the average dimension of said particles across the surfaces, said color zones being substantially parallel to said surfaces.

4. Micromagnets according to claim 3 wherein said magnetization vector is substantially normal to said surfaces.

5. Micromagnets according to claim 3 comprising a hardened synthetic organic polymer containing finely divided barium ferrite.

6. Magnetically orientable micromagnets having at least two separate and distinct surface color zones and a constant magnetization vector, said magnetization being insufficient in strength to cause among the micromagnets in close association in a liqud a sufficient magnetc interaction to prevent selective orientation by an external activating magnetic force, said micromagnets having flat, generally parallel, top and bottom surfaces and irregularly shaped edges, the thickness of said particles between said top and bottom surfaces being less than the average dimension of said particles across said surfaces and said magnetization vector being substantially normal to said surfaces.

References Cited

UNITED STATES PATENTS 3,124,725  3/1964  Leguillon _____ 335—303

FOREIGN PATENTS 102,151  7/1963  Norway.

GEORGE HARRIS, *Primary Examiner.*